March 31, 1970  D. J. BERRY ET AL  3,503,110

SECURING TUBES INTO TUBE PLATES

Filed Feb. 24, 1967  2 Sheets-Sheet 1

INVENTORS
David John Berry
Roy Hardwick

BY Watson, Cole, Grindle & Watson

ATTORNEYS

March 31, 1970   D. J. BERRY ET AL   3,503,110
SECURING TUBES INTO TUBE PLATES
Filed Feb. 24, 1967   2 Sheets-Sheet 2

INVENTORS,
David John Berry
Roy Hardwick
BY
Watson, Cole, Grindle & Watson
ATTORNEYS 3,503,110
SECURING TUBES INTO TUBE PLATES
David John Berry, Sherburn-in-Elmet, and Roy Hardwick, Woodlesford, near Leeds, England, assignors to Yorkshire Imperial Metals Limited, Stourton, near Leeds, Yorkshire, England
Continuation-in-part of application Ser. No. 576,938, Sept. 2, 1966. This application Feb. 24, 1967, Ser. No. 618,489
Claims priority, application Great Britain, Sept. 14, 1965, 39,172/65
Int. Cl. B23k *31/02*
U.S. Cl. 29—157.4                                    6 Claims

ABSTRACT OF THE DISCLOSURE

A method is disclosed for securing a metal tube having a smooth exterior into a metal tube plate. The tube is inserted in an aperture in the tube plate, the aperture having a smooth interior and the distance between the inner wall of the aperture and the outer wall of the tube is tapered to increase toward one end of the tube. The aperture or the tube may be constructed to provide this taper. An explosive charge is placed within the tube and detonation of the charge serves to weld the tube to the tube plate. An outer end of the aperture may be radiused or angled so that when the welding operation is carried out a portion of the tube projecting beyond said end will be severed and removed.

---

Figure 1:
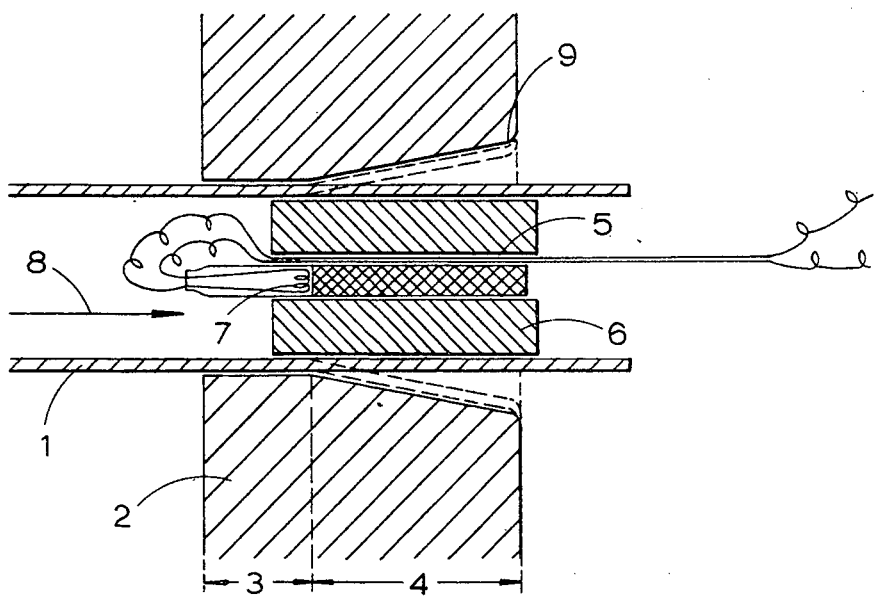

This application is a continuation-in-part of our application Ser. No. 576,938, filed Sept. 2, 1966, now abandoned.

This invention relates to an improved method of securing tubes into tube plates using sources of energy which supply energy at a high rate, particularly explosives.

The connection of a tube into a tube plate is required in various applications one of which is in heat exchangers in which a large number of parallel tubes are secured at their ends into a tube plate which extends substantially perpendicular to the longitudinal direction of the tubes. The joints between the tubes and the tube plate must be proof against leaks to avoid the intermixing of the materials between which the heat is being exchanged.

Known methods of jointing tubes into a tube plate include the use of packing between the tube and the tube plate, rolling-in using an expanding tool and welding using gas or arc welding. Packed joints require a high degree of skill in assembly to ensure maximum tightness without damaging the tubes and the joints tend to loosen after some time in service and they are then unable to withstand high pressure differentials. Expanded joints require precise control of the shape, dimensions and surface finish of the holes in the tube plate for receiving the tubes if good results are to be ensured and the degree of expansion and the positioning of the expanding tool within the tube plate are also critical. Intrinsically, expanded joints lead to a slow rate of assembly because the joints have to be rolled sequentially and in some circumstances this gives rise to a complex and undesirable stress pattern in the tubes and in the tube plate. The use of conventional welded joints is restricted because the materials of the tubes and tube plate have to be metallurgically compatible. The weld zone often has undesirable metallurgical characteristics and softening of the tube invariably occurs as a result of the temperatures reached during welding. The thickness of the weld zone is approximately equal to the wall thickness of the table and slight variations in the weld thickness can cause unreliability in the weld which can lead to leaks.

The present invention contemplates the use of high energy rate methods of fixing tubes into tube plates which involves the release of explosive energy, and it has been found that in this way the tubes can be joined to the tube plate by a metallurgical bond covering the contact face.

It has been found in the past that when using explosive charges as the source of energy the choice of fully satisfactory explosives is limited to explosives which have a detonation velocity not greater than about 120% of the velocity of sound in that metal in the tube or tube plate which has the higher sonic velocity. Also, the clearance of the tube in the plate has been thought to be important, needing close control of manufacturing tolerances of the tube and hole. Where explosives of higher detonation velocities have been used we have found that the quality of the joints have been inconsistent and only a limited length of welded zone has been achieved.

Thus, one object of the present invention is to provide a method of reliably fixing tubes into tube plates in which a larger range of explosives may be employed and which does not demand high tolerance machining.

According to the invention there is provided a method of securing a metal tube into a metal tube plate which comprises the steps of locating the tube in an aperture in the tube plate, wherein the distance between the outer wall of the tube and the walls of the aperture increases towards the adjacent free end of the tube, positioning an inert annular energy transmitting insert inside the tube and a source of energy which will supply energy at a high rate within the insert inducing release of energy from the source. The increasing separation between the outer wall of the tube and the walls of the aperture may be achieved by tapering the walls of the aperture over at least a part of its length or alternatively tapering the outer diameter of a portion of the tube which is disposed within the tube plate aperture in the direction of its adjacent free end. Preferably the source of energy is arranged in such a way that energy is first applied to that part of the tube within the aperture which is separated by the smallest distance from the walls of the aperture and so that the energy travels in the form of a wave in the direction of the adjacent free end of the tube. The outer end of the aperture is preferably suitable radiused or angled into the outer face of the tube plate so that the tube is forced against this radiused or angled portion thereby severing the tube circumferentially at this point and providing a smooth entry profile.

Figure 2:
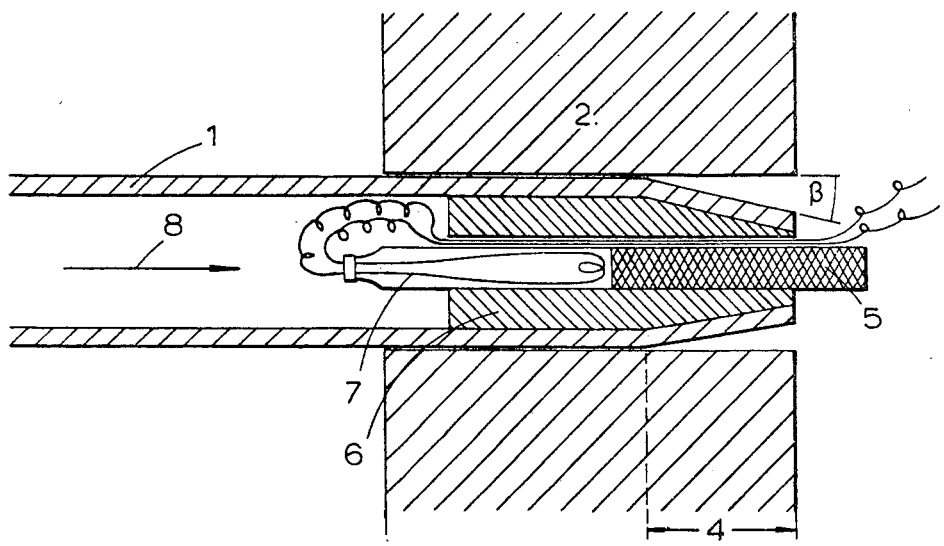
Figure 3:
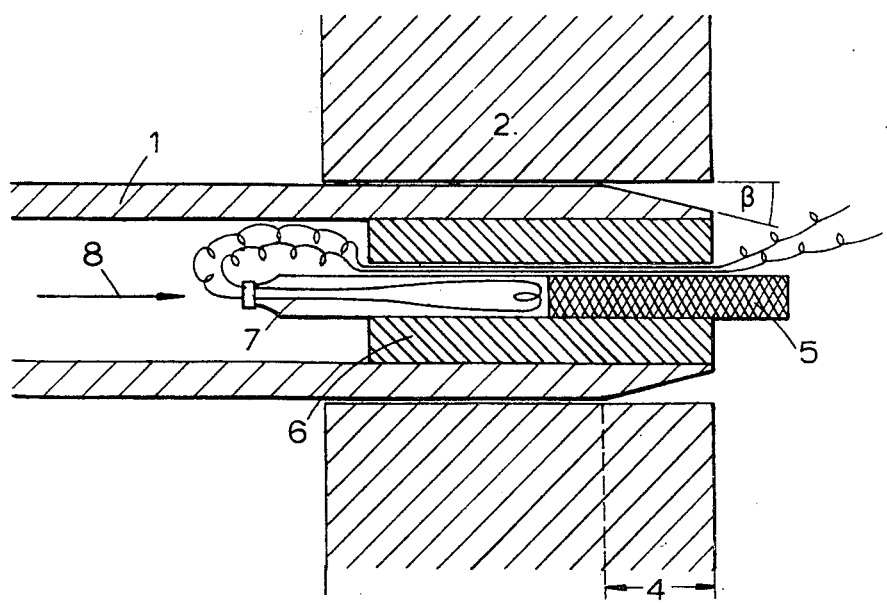

Features and advantages of the invention will be apparent from the following description of various embodiments of the invention given by way of example only, with reference to the accompanying drawings in which:

FIGURE 1 is a longitudinal section through a tube located in a tube plate showing one possible arrangement, FIGURE 2 is a longitudinal section through a tube located in a tube plate illustrating an alternative arrangement and FIGURE 3 is a longitudinal section through a tube located in a tube plate showing a further alternative arrangement.

Referring to FIGURE 1, a tube 1 is positioned in an aperture in a tube plate 2. The aperture comprises an axial portion 3 of uniform diameter and a further axial portion 4 of increasing diameter (in the direction away from the portion 3) which gives this portion a frusto-conical shape.

The uniform diameter portion 3 is not essential to the performance of the invention and the whole of the aperture may vary in diameter. The portion 3 is however useful in positioning the tube. The portion 4 can be either a uniform taper or it can be profiled to an exponential curve or double taper, for example. The precise shape or the angle of taper is not critical between wide limits and can be varied to give the most appropriate tube entry profile or most economic preparation according to requirements.

The tube 1 is located in the aperture and extends to the left of the tube plate 2 as shown in the drawing towards another tube plate (not shown). The tube may extend to the right of the tube plate and project slightly from the tube plate by a short excess to allow for slight variation in the heat exchanger length arising during construction. Alternatively, the tube end may lie substantially coplanar with the outer surface of the tube plate i.e. the right hand surface as shown in FIGURE 1.

A source 5 of energy which can be released at a rapid rate and which may be a chemical, electrical (including an electro-hydraulic source) or mechanical or any combination of these, is positioned in the tube 1 to lie substantially within the portion 4 of the tube plate. The source of energy shown in FIGURE 1 is a conventional electric detonator explosive charge and this is surrounded by a transmitting insert 6, which is a push fit within the tube. The explosive charge is also a push fit within the transmitting insert. The nature of the insert material is not important through it preferably should be of medium or high density and it serves to transmit the explosive wave to the tube and tube plate. The effective density of the insert material may be varied along its length to permit changes in efficiency of energy transmission if so desired.

The positioning of the explosive charge with respect to the tube plate although not critical should be such that the effective length of the charge lies substantially within the portion 4.

After assembly of the components as shown in FIGURE 1 the explosive charge is initiated using conventional methods such as the electrical heating element 7 shown and detonation starts from the left hand end as shown in the drawing. It is preferable that the detonation of the explosive source should proceed in this direction as indicated by the arrow 8, that is in the same direction as the increase in diameter of the aperture for the best metallurgical bond to be obtained.

Any number of adjacent or remote tubes may be secured simultaneously depending upon local convenience.

The released energy expands the tube in such a way that a metallurgical bond is formed over the area of contact at the angled interface of the tube and tube plate. Reasonable cleanliness of the tube is required in order to achieve full bonding and surface oxides and grease are removed before assembly by suitable means, such as abrasive cleaning and organic solvents.

The larger diameter end of the aperture is suitably radiused or angled at 9 so that a second and the simultaneous action of the energy released by the explosive charge is to force the tube against the contour of this radius or angled portion thereby severing the tube circumferentially at this point to remove the excess length of tube and form a smooth entrance to the tube. The erosion of the tube entrance which occurs in conventional tube plates installations is thereby reduced by providing a gradual and smoother entrance at the tube inlet.

The precise shape of the angle or radius supplied to the edge 9 is not critical and may be varied for different materials.

FIGURES 2 and 3 show modified arrangements in which the aperture in the tube plate 2 is uniform along its length and the separation between the outer wall of the tube 1 and the inner walls of the tube plate 2 is varied by modifying the shape of the free end portion of the tube 1. In FIGURES 2 and 3 reference numerals for similar parts are the same as those used in FIGURE 1. Referring to FIGURE 2 it will be noted that the free end of the tube 1 is tapered for example by swaging so that both the inner and outer diameters of the tube taper towards its outer end (i.e. the right hand end as shown in FIGURE 2). The angle which the tapered portion 4 of the tube makes with the wall of the aperture is indicated by the symbol $\beta$. It will be noted that as shown in both FIGURES 2 and 3 the explosive charge 5 is inserted into the insert 6 in such a way that it extends over the tapered portion 4 of the tube. As shown the explosive 5 may extend beyond the outer end of the tube 1.

Referring specifically to FIGURE 3 the outer end portion of the tube 1 is tapered over a portion 4 by for example machining the wall of the tube. Thus the outer diameter of the tube tapers over the portion 4 while the inner diameter is substantially uniform in diameter. The angle formed between the outer surface of the tube portion 4 and the walls of the tube plate indicated by the symbol $\beta$. An explosive charge is inserted into the tube in such a way that it extends over the whole of the tapered portion 4 and as shown it may project beyond the outer end of the tube 1.

As indicated in connection with FIGURE 1 it is not essential for the outer end of the tube to coincide with the outer face of the tube plate and good results can be obtained with the arrangement shown in FIGURES 2 and 3 when the tube extends beyond the tube plate and is automatically cut off in the course of the detonation. Sufficient length of tapered tube should however lie within the tube plate in order to achieve an adequate degree of welding.

Various embodiments of tube and tube plate materials have been successfully bonded in accordance with this invention. The following examples illustrate some of the many combinations of metal that can be bonded together.

EXAMPLE 1

Profiled holes were drilled in a naval brass tube plate of 1¼" thickness. The parallel portion 3 of the bore extended over a length of ⅝" and was of 1.005" dia. The angle of taper was 7°30' making an included angle of 15°. The tube plate hole was cleaned and degreased, and similarly prepared 1" x 20 SWG hard, stress relieved, aluminium brass tube inserted. An explosive charge consisting of a No. 8 Star detonator was placed within a transmitting insert of wax and sawdust. The insert and detonator were placed within the tube, the innermost end of the insert lying ⅜" from the inner face of the tube plate, that is the left hand face as shown in the drawing.

Following detonation of the explosion ¼" wide sections were cut longitudinally through the tube and tube plate at four points. A quantitative measure of the bond strength was obtained by carrying a tensile shear test on each of the four sections. In each case the parent tube broke at a tensile load of 0.25 ton and the bond remained intact. By extrapolation, this would constitute a load of 3.14 tons around the circumference of the unsectioned tube.

EXAMPLE 2

The technique and explosive of Example 1 were used to weld 1" x 22 SWG hard, stress relieved aluminium brass tubes into a copper nickel tube plate. Some holes were profiled to give parallel length of ⅝" and an angle of taper of 5° (10° included angle) and other holes were profiled to a smooth curve in place of the straight taper.

An excellent weld of similar quality to that in Example 1 was obtained, in all cases.

EXAMPLE 3

The technique and explosive of Example 1 were to weld 1" x 18 SWG 90/10 copper/nickel tube heat treated so as to be in a condition siutable for roller expansion, into a copper nickel tube plate.

Following detonation of the explosive, the tube and tube plate were firmly welded together.

EXAMPLE 4

The technique of Example 1 was used to weld a 1" x 18 SWG hard, 70/30 copper nickel tube into a navel brass tube plate. The explosive used in this case was metabel (an explosive having a detonation velocity of approximately 7000 m./sec.) initiated by a No. 8 Star detonator.

An excellent weld of similar quality to that of the above examples was obtained.

EXAMPLE 5

Twenty five 1″ x 20 SWG hard stress relieved aluminium brass tubes were simultaneously expanded into a naval brass tube plate using the technique of Example 1. After twenty five tubes 1″ x 20 SWG hard stress relieved aluminium brass tubes were simultaneously expanded into 1.015″ diameter parallel bore holes in the same tube plate. The twenty five tubes expanded in the profiled holes were all excellently welded.

EXAMPLE 6

An aluminium brass tube of 1″ x 18 SWG was prepared by swaging to produce a 12° angle $\beta$ (FIGURE 2) over a length of ⅝″ extending from the tube end. The tube was then positioned in a parallel hole of 1.005″ dia. machined in rolled naval brass tubeplate with the tube end coinciding with the outer surface of the tubeplate. A No. 8 Seismic Star detonator was positioned in a mouldable plastic transmitting insert and inserted into the tube in such a way that on detonation the wave front proceeded in the direction of increasing gap between tube and tubeplate.

After initiating the charge, the joint was examined and a good quality weld was observed over an interface of ½″ length.

EXAMPLE 7

A copper tube of 1″ x 14 SWG was prepared by machining down the outside surface to produce a 10° angle $\beta$ (FIGURE 3) over ⅝″ length from the tube end. The tube was then positioned in a parallel hole of 1.005″ dia. machined in rolled naval brass tubeplate, with the tube end coinciding with the outer face of the tubeplate. A No. 8 Seismic Star detonator supplemented by an annular charge of I.C.I. explosive "Metabel" was positioned in a polythene transmitting insert and placed in the tube in such a way that on detonation the wave front proceeded in the direction of increasing gap between tube and tubeplate.

We claim:

1. A method of welding a metal tube into a metal tube plate which comprises the steps of:
   (a) locating the tube in an aperture in the tube plate so that the tube projects outwardly beyond one face of the tube plate by a greater distance than it projects from an opposite face, the exterior of the tube and the interior of the tube plate having smooth surfaces and the distance between the exterior of the tube and the interior of the aperture tapering towards and up to said opposite face of the tube plate;
   (b) positioning an inert annular explosive-energy transmitting insert inside the tube;
   (c) positioning an explosive charge into said insert with the preponderant mass of the explosive charge disposed wholly within the tube plate; and
   (d) detonating said explosive charge so that the resulting detonation wave travels in a direction towards the opposite face of the tube plate and in the direction of increasing taper to form a metallurgical bond between the tube and the tube plate.

2. A method according to claim 1 in which the aperture in the tube plate tapers over at least a part of its length.

3. A method according to claim 1 in which the outer end of the aperture at said opposite face of the tube is radiused or angled into the outer face of the tube plate so that the tube is forced against said radiused or angled portion by the explosive energy released by detonation of said charge thereby severing the tube circumferentially at this point to remove the excess length of tube projecting from the opposite face of the tube plate.

4. A method according to claim 1 in which the outer diameter of a portion of the tube disposed within the tube plate aperture tapers in the direction of said opposite face of the tube plate.

5. A method according to claim 1 in which both the inner and outer diameters of a portion of the tube disposed within the tube plate taper towards said opposite face of the tube plate.

6. A method according to claim 1 in which the explosive charge has a detonation velocity of more than 120% of the velocity of sound in the metal of the tube or plate which has a higher sonic velocity.

References Cited

UNITED STATES PATENTS

| 3,409,969 | 11/1968 | Simons et al. | 29—157.3 |
| 3,131,467 | 5/1964 | Thaller | 29—421 |
| 3,258,841 | 7/1966 | Ropoff | 29—497.5 X |
| 3,263,323 | 8/1966 | Maher et al. | 29—470.1 X |
| 3,292,253 | 12/1966 | Rossner et al. | 29—421 |
| 3,313,021 | 4/1967 | Wright et al. | 29—421 X |
| 3,364,562 | 1/1968 | Armstrong | 29—421 X |

PAUL M. COHEN, Primary Examiner

U.S. Cl. X.R.

29—157.3, 421, 470.1, 497.5